US012636809B2

(12) United States Patent
Kanjee

(10) Patent No.: US 12,636,809 B2
(45) Date of Patent: May 26, 2026

(54) LUMBER ASSEMBLY AND FINISHING SYSTEM

(71) Applicant: Columbia Insurance Company, Omaha, NE (US)

(72) Inventor: Manish Kanjee, O'Fallon, MO (US)

(73) Assignee: Columbia Insurance Company, Omaha, NE (US)

( * ) Notice: Subject to any disclaimer, the term of this patent is extended or adjusted under 35 U.S.C. 154(b) by 0 days.

(21) Appl. No.: 18/991,870

(22) Filed: Dec. 23, 2024

(65) Prior Publication Data

US 2025/0128448 A1        Apr. 24, 2025

Related U.S. Application Data

(62) Division of application No. 17/073,488, filed on Oct. 19, 2020, now Pat. No. 12,172,338.

(60) Provisional application No. 62/916,878, filed on Oct. 18, 2019.

(51) Int. Cl.
| | |
|---|---|
| *B27F 7/15* | (2006.01) |
| *B25J 9/00* | (2006.01) |
| *B25J 9/02* | (2006.01) |
| *B25J 15/00* | (2006.01) |
| *B65G 13/02* | (2006.01) |
| *B65G 57/16* | (2006.01) |
| *B65G 61/00* | (2006.01) |
| *E04C 3/12* | (2006.01) |
| *F16B 15/00* | (2006.01) |

(52) U.S. Cl.
CPC ............. *B27F 7/155* (2013.01); *B25J 9/0096* (2013.01); *B25J 9/026* (2013.01); *B25J 15/0019* (2013.01); *B65G 13/02* (2013.01);

*B65G 57/16* (2013.01); *B65G 61/00* (2013.01); *E04C 3/12* (2013.01); *F16B 15/0023* (2013.01)

(58) Field of Classification Search
CPC ......... Y10T 29/53317; Y10T 29/53383; Y10T 29/53365; Y10T 29/49625; Y10T 29/49629; B27F 7/155; B27F 7/02; B27F 7/15
USPC ......................................................... 269/910
See application file for complete search history.

(56) References Cited

U.S. PATENT DOCUMENTS

| | | | |
|---|---|---|---|
| 3,100,301 | A | 8/1963 | Black |
| 3,172,125 | A | 3/1965 | Sanford |
| 3,212,694 | A | 10/1965 | Sanford |
| 3,255,943 | A | 6/1966 | Sanford |
| 3,390,628 | A | 7/1968 | Sanford |
| 3,413,703 | A | 12/1968 | Sanford |
| 3,435,508 | A | 4/1969 | Sanford |
| 3,439,607 | A | 4/1969 | Sanford |

(Continued)

FOREIGN PATENT DOCUMENTS

WO          2019079728 A1        4/2019

OTHER PUBLICATIONS

"Auto Eye Truss System", by Ake Svensson, uploaded Mar. 28, 2011, https://www.youtube.com/watch?v=mrEzK9HzXw4.

*Primary Examiner* — Jason L Vaughan
(74) *Attorney, Agent, or Firm* — Stinson LLP

(57)        ABSTRACT

A lumber assembly and finishing system for use in assembling constructs includes a lumber table configured to support arranged pieces of lumber. A press station presses nailing plates into the pieces of lumber to join the pieces of lumber together to form the lumber construct. A lumber construct transporter moves the arranged pieces of lumber (Continued)

from the lumber table to the press station while keeping the pieces of lumber in their arranged configuration.

9 Claims, 8 Drawing Sheets

(56)                    References Cited

U.S. PATENT DOCUMENTS

| | | | |
|---|---|---|---|
| 3,464,348 A | 9/1969 | McGlinchey | |
| 3,538,843 A | 11/1970 | Lubin | |
| 3,785,277 A | 1/1974 | Schmitt | |
| 3,855,917 A | 12/1974 | Farrell et al. | |
| 3,896,717 A | 7/1975 | Schmitt | |
| 4,063,498 A | 12/1977 | Labellarte | |
| 4,089,107 A | 5/1978 | Sanford | |
| 4,437,234 A | 3/1984 | Thornton | |
| 5,048,409 A | 9/1991 | Schulz | |
| 5,092,028 A | 3/1992 | Harnden | |
| 5,211,108 A | 5/1993 | Gore et al. | |
| 5,211,381 A | 5/1993 | Shaw | |
| 5,285,720 A | 2/1994 | Wright | |
| 5,361,495 A | 11/1994 | Pyle et al. | |
| 5,553,375 A | 9/1996 | Powers | |
| 6,079,325 A | 6/2000 | LePoire et al. | |
| 6,219,904 B1 | 4/2001 | Debanne | |
| 6,702,269 B1 | 3/2004 | Tadich | |
| 6,807,903 B2 | 10/2004 | Anderson | |
| 6,926,185 B2 | 8/2005 | Svensson | |
| 6,955,346 B2 | 10/2005 | Anderson | |
| 7,093,350 B2 | 8/2006 | McNeelege et al. | |
| 7,172,064 B2 | 2/2007 | Alversson | |
| 8,302,292 B2 | 11/2012 | McAdoo et al. | |
| 8,359,737 B2 | 1/2013 | Englundh | |
| 8,818,547 B2 | 8/2014 | McAdoo et al. | |
| 8,984,732 B2 | 3/2015 | Svensson | |
| 9,353,519 B2 | 5/2016 | Williams | |
| 10,662,004 B1 | 5/2020 | Schulz et al. | |
| 10,814,519 B2 | 10/2020 | Aylsworth | |
| 11,618,180 B2 | 4/2023 | Turulin et al. | |
| 11,691,310 B2 | 7/2023 | Jin et al. | |
| 2008/0172983 A1 | 7/2008 | Urmson | |
| 2010/0024345 A1 | 2/2010 | McAdoo et al. | |
| 2010/0061829 A1 | 3/2010 | McAdoo et al. | |

LUMBER ASSEMBLY AND FINISHING SYSTEM

CROSS-REFERENCE TO RELATED APPLICATIONS

This application is a divisional of U.S. Nonprovisional application Ser. No. 17/073,488, filed Oct. 19, 2020 which claims priority to U.S. Provisional Application No. 62/916,878, filed Oct. 18, 2019, the entireties of which are hereby incorporated by reference.

FIELD

The present disclosure generally relates to automated lumber construction systems. More particularly the disclosure relates to the assembly and movement of sections of lumber.

BACKGROUND

Rising labor costs and demands for more time and cost-efficient construction have made it desirable to construct building components and modules off site at specialized fabrication facilities. With wood frame structures, especially prefabricated residential structures, there are great economies to be realized by providing automated equipment that can measure and cut lumber components utilized in wall panels, roof trusses, and other prefabricated items. Where significant quantity of a particular structural element, such as roof trusses, is needed, the use of such automated systems can greatly decrease construction time and lower costs, especially labor costs. The economies of this approach are very appealing for custom structural designs. For wood structures where the framing is constructed on site, precutting and marking lumber off site location can create a kit design minimizing measuring, sawing, and the need for specialized labor on site. This can result in faster construction as well as minimized cost. On-site construction errors can also be minimized.

Prefabricated roof trusses in particular, generally include multiple pieces of lumber that must arranged and joined together. A typical roof truss includes two top chords, a bottom chord, several webs and many also include overhangs. However, many different truss configurations are possible. Truss or nailing plates with teeth are typically utilized to securely connect the pieces of lumber together to form the truss. Once assembled, the truss can be transported to the construction site and installed.

SUMMARY

In one aspect, a lumber assembly and finishing system for use in assembling lumber constructs comprises a lumber table configured to support arranged pieces of lumber. A press station is configured to press nailing plates into the pieces of lumber to join the pieces of lumber together to form the lumber construct. A lumber construct transporter is configured to move the arranged pieces of lumber from the lumber table to the press station while keeping the pieces of lumber in their arranged configuration.

In another aspect, a press station for pushing nailing plates into adjacent pieces of lumber to join the pieces of lumber together comprises upper and lower platen assemblies. Each platen assembly includes a platen configured to press one nailing plate into the pieces of lumber to join the pieces of lumber together. The upper and lower platen assemblies are each configured to rotate their respective platen to orient the nailing plate relative to the pieces of lumber before the platen presses the nailing plate into the pieces of lumber.

In another aspect, an assembly table for arranging pieces thereon to form a construct comprises opposite first and second tracks having a longitudinal axis. A plurality of jig rails extend between the first and second tracks and define a support surface on which the pieces are placed. Each jig rail is movably mounted on the first and second tracks such that each jig rail can move in a direction generally parallel to the longitudinal axis along the first and second tracks. Each jig rail includes at least one clamp assembly movably mounted on the jig rail and configured to clamp at least one piece to secure the piece in position on the support surface.

In another aspect, a method of pressing nailing plates into adjacent pieces of lumber to join the pieces of lumber together comprises moving the pieces of lumber into a press station; retrieving, via a shuttle, a pair of nailing plates from a cartridge of a magazine station; loading each nailing plate onto a platen of the press station; rotating each platen to orient the nailing plate thereon relative to the pieces of lumber; moving each platen toward the pieces of lumber to press the nailing plates into the pieces of lumber; and moving the pieces of lumber out of the press station.

Other objects and features of the present disclosure will be in part apparent and in part pointed out hereinafter.

BRIEF DESCRIPTION OF THE DRAWINGS

Corresponding parts are indicated by corresponding reference characters throughout the several views of the drawings.

DETAILED DESCRIPTION

Figure 1:
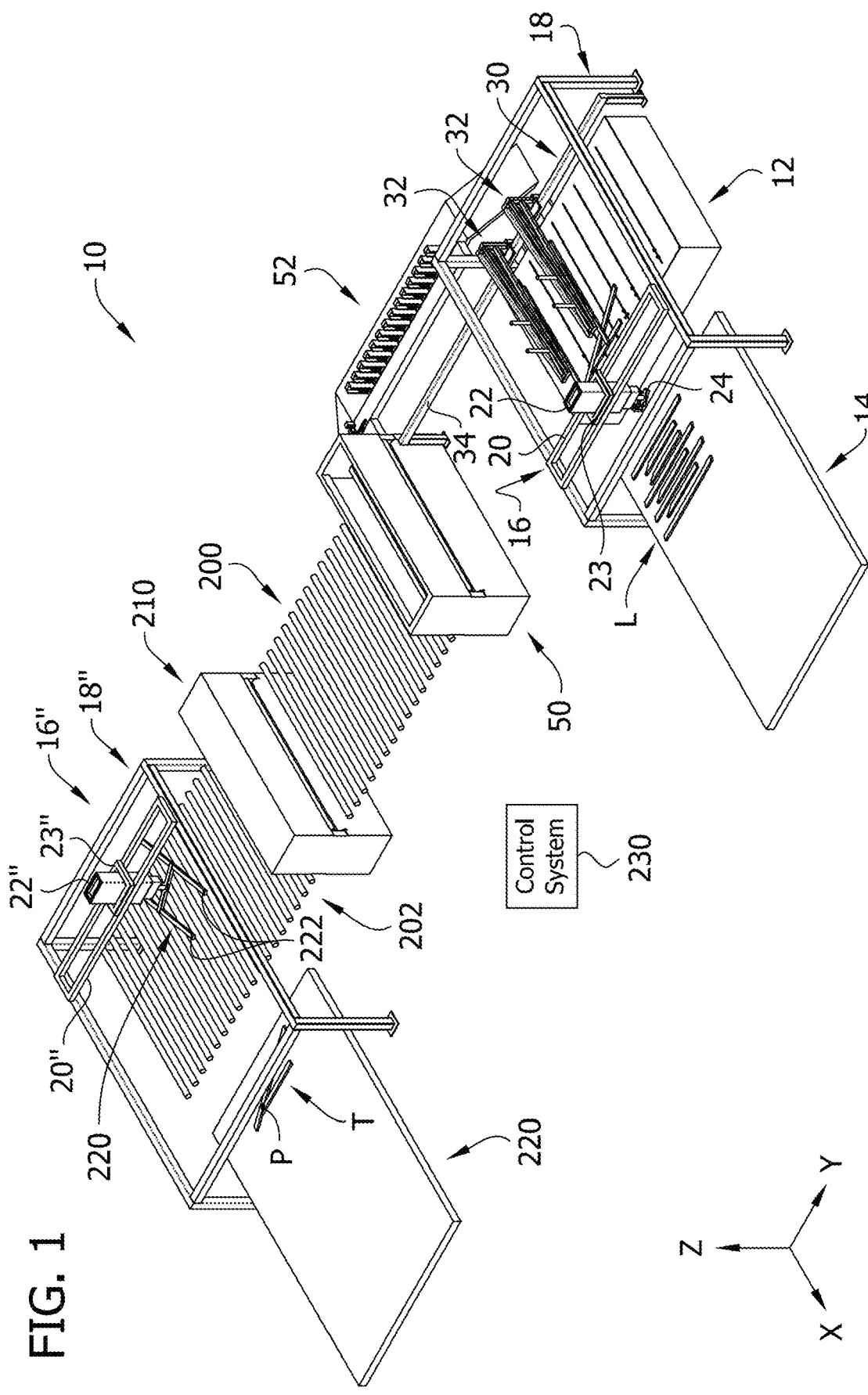
FIG. 1 is a schematic perspective of one embodiment of a lumber assembly and finishing system according to the present disclosure.
Figure 2:
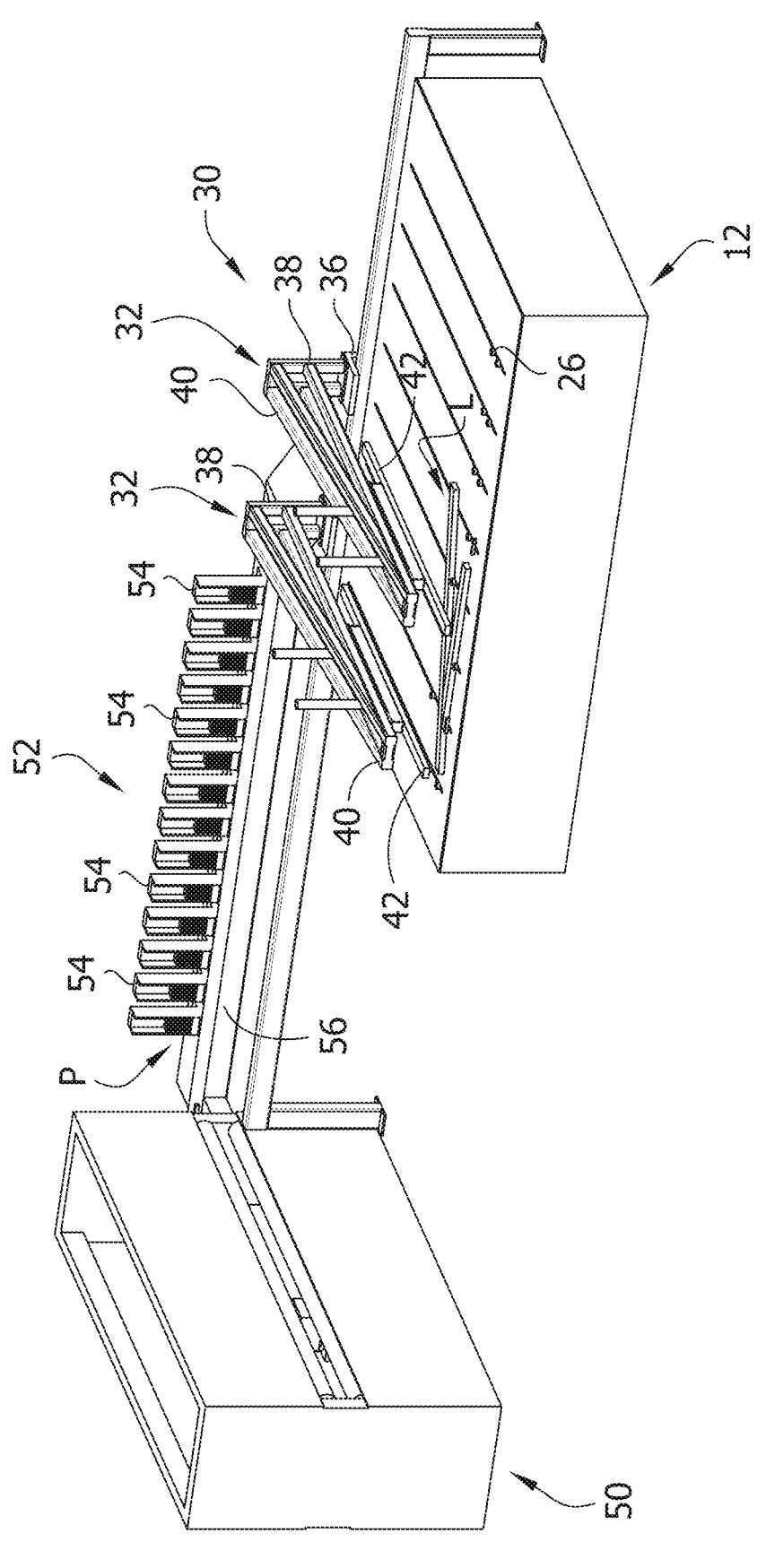
FIG. 2 is a schematic, enlarged front perspective of a truss table, a lumber construct transporter, and a press station of the lumber assembly and finishing system.
Figure 3:
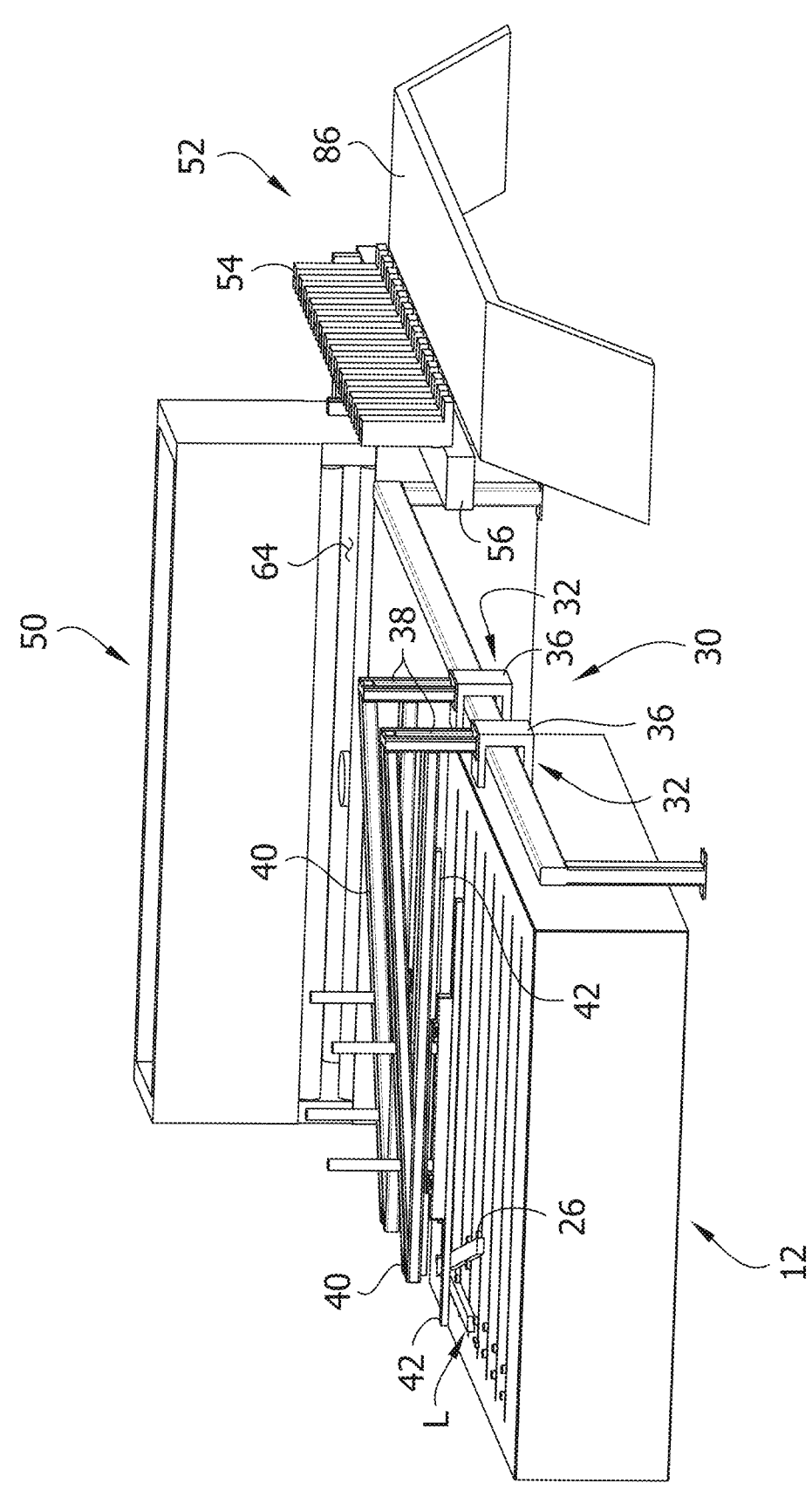
FIG. 3 is a rear perspective thereof.

Referring to FIG. 1-3, one embodiment of a lumber assembly and finishing system or truss assembly line constructed according to the principles of the present disclosure is generally indicated at 10. The lumber assembly and finishing system 10 is generally automated and is used to assemble cut pieces of lumber, generally indicated at L, into lumber constructs, such as trusses. For example, the lumber assembly and finishing system 10 can be used to assemble jack trusses. In one embodiment, the lumber assembly and finishing system 10 is combined with (e.g., added to the end of) a lumber cutting and delivery system, such as the lumber cutting and delivery system described in PCT Application No. PCT/US2018/056723, the entirety of which is hereby incorporated by reference. Although the lumber assembly and finishing system 10 is described herein in terms of constructing trusses, the system has application to the production of other items. For example and without limitation, the system 10 could be used in the manufacture of wall frames and floor trusses. In general, the lumber assembly and finishing system 10 may be used to assemble cut pieces of lumber L to create any lumber construct, particularly (but not exclusively) those which are joined together using nailing plates P. "Boards", "lumber", "lumber members" and "pieces of lumber" are intended to be interchangeable herein unless the context clearly indicates the contrary.

The lumber cutting and delivery system 10 includes a lumber or truss table (broadly, a build station), generally indicated at 12. In the illustrated embodiment, the truss table 12 is positioned adjacent to an end of a conveyor system, generally indicated at 14, which delivers cut pieces of lumber L to the truss table. These pieces of lumber L on the conveyor system 14 have already been cut to shape and are ready to be arranged to form a truss. It is understood the truss table 12 may be used to arranged pieces of lumber L to form lumber constructs other than trusses. Further details on a suitable system for the cutting and delivery of the pieces of lumber L to the truss table 12 can be found in PCT Application No. PCT/US2018/056723. In another embodiment, the cut pieces of lumber L are delivered to the truss table 12 manually, such as by carts.

Referring to FIGS. 1-3, the truss table 12 generally includes a large, flat support surface with an automated jigging system allowing pieces of lumber L to be quickly positioned to form the truss or other arranged configurations. The jigging system includes stops 26 that are automatically moved into position on the truss table 12 to facilitate the positioning and holding of the pieces of lumber L on the truss table. The truss table 12 may be of generally any length and width to accommodate trusses of generally any size. Further details of truss tables may be found in U.S. Pat. Nos. 6,702,269 and 6,807,903, the entireties of which are hereby incorporated by reference.

In one method of arranging the pieces of lumber L on the truss table 12, an operator grabs the lumber and arranges the lumber on the truss table to form the truss. The operator may then staple the pieces of lumber to one another to hold the pieces together. The staples (not shown) temporarily hold the pieces of lumber L together until nailing plates P can be attached to permanently secure the pieces together. Alternatively, in the illustrated embodiment, the lumber assembly and finishing system 10 includes a robotic placement device, generally indicated at 16, configured to pick up the pieces of lumber L from the conveyor system 14, orient the pieces and arrange the pieces on the truss table 12 to form a truss. Some combination of manual and automated placement may also be employed.

The robotic placement device 16 includes a framework 18 disposed over the truss table 12 and at least the end of the conveyor system 14. The framework 18 supports a first carriage member 20 moveably mounted on the framework. The first carriage member 20 moves linearly along the framework in a direction generally parallel to the x-axis (FIG. 1). One or more prime movers (not shown), such as electric motors, are operatively connected to the first carriage member 20 to move the first carriage member along the framework 18. The first carriage member 20 supports a robotic arm 22 moveably mounted on the first carriage member. The robotic arm 22 is supported by a second carriage member 23 that moves linearly along the first carriage member 20 in a direction generally parallel to the y-axis (FIG. 1). One or more prime movers (not shown), such as electric motors, are operatively connected to the second carriage member 23 to move the robotic arm 22 along the first carriage member 20. By moving the first carriage member 20 and second carriage member 23, the robotic arm 22 can be moved to any position above the truss table 12 and from the conveyer system 14 to the truss table 12 or vice versa.

The robotic arm 22 includes a head 24 configured to pick up a piece of lumber L. The robotic arm 22 can move the head 24 vertically (e.g., in a direction generally parallel to the z-axis) to reach the lumber L on the conveyor system 14 and to place the lumber on the truss table 12. In one embodiment, the head 24 uses suction to pick up a piece of lumber L, although other configurations are within the scope of the present disclosure. Once the head 24 grabs a piece of lumber L, the robotic arm 22 is moved to the correct position over the truss table 12 and the robotic arm positions the piece of lumber on the truss table. The robotic arm 22 can also rotate the head 24 to properly orient the piece of lumber L prior to placing the lumber on the truss table. In this embodiment, the stops 26 (e.g., jigging system) of the truss table 12 are spaced apart by a distance larger than the size of the piece of lumber L to provide the necessary clearance to permit the robotic arm 22 to place the lumber between the stops. In one embodiment, after all the piece of lumber L are arranged on the truss table 12, the truss table 12 may move the stops 26 toward the pieces of lumber to finalize the position of the pieces of lumber L (e.g., clamp the pieces of lumber into position). The head 24 of the robotic arm 22 can include a stapler (not shown) to staple the piece of the lumber L together once the pieces of lumber are arranged on the truss table 12, such as after the stops 26 clamp and hold the pieces of lumber in position. Preferably, two or more staples are used.

Figure 4:
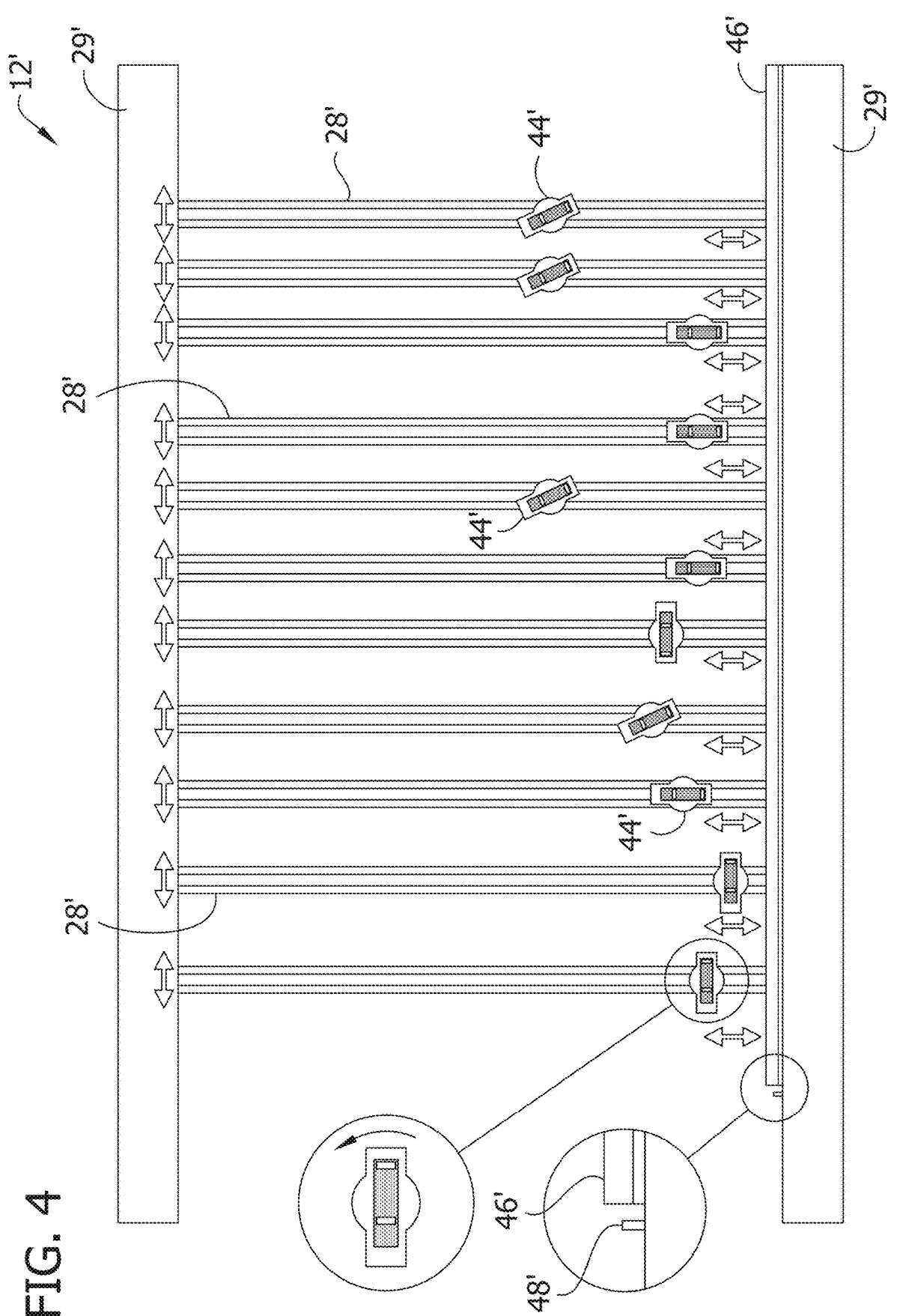
FIG. 4 is a top view of another embodiment of a truss table of the lumber assembly and finishing system.
Figure 5:
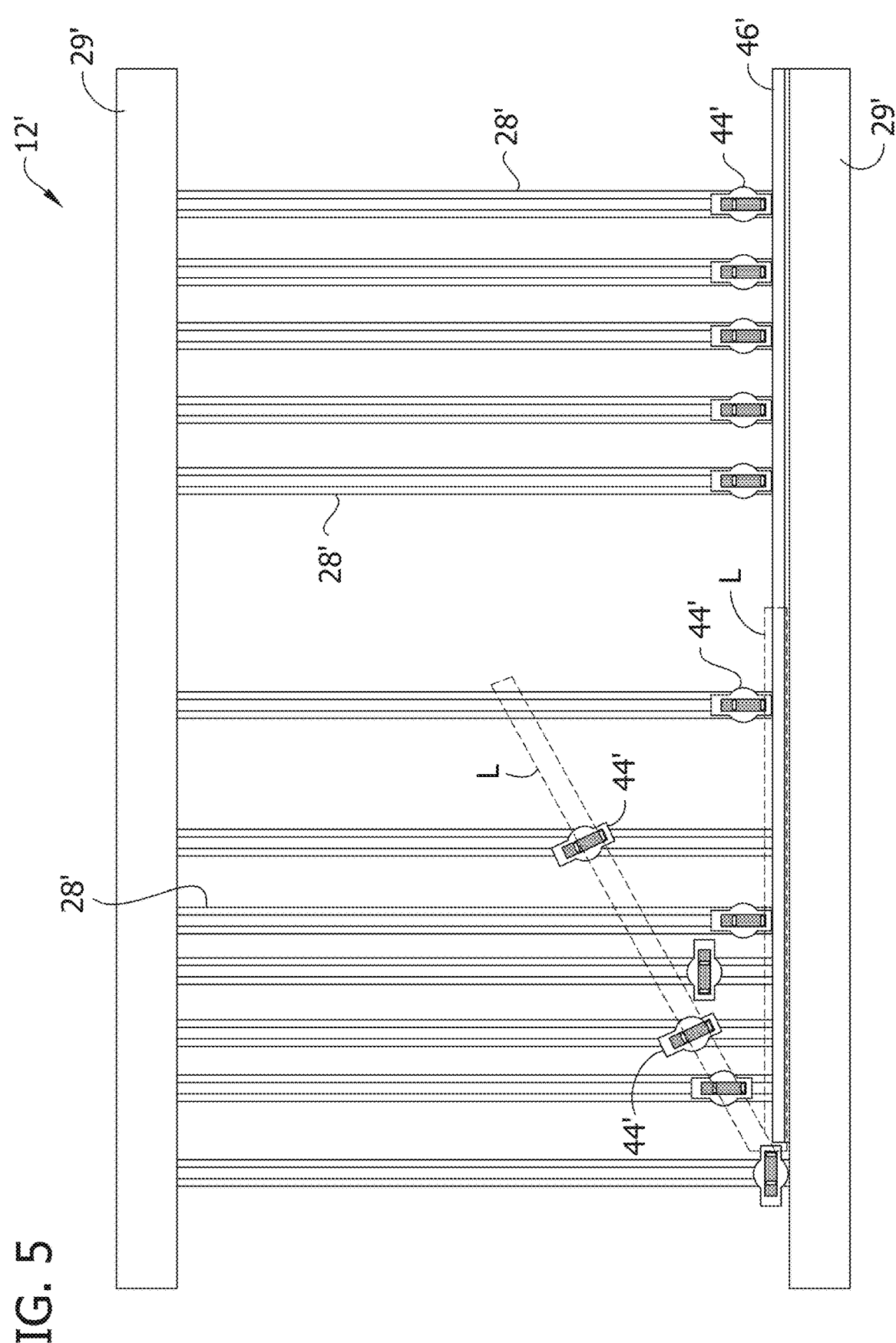
FIG. 5 is a top view of the truss table of FIG. 4 supporting and holding pieces of lumber.

Referring to FIGS. 4 and 5, truss tables of other configurations are within the scope of the present disclosure. One example of such a truss table is generally indicated at 12'. Like truss table 12, truss table 12' includes a large, flat support surface with an automated jigging system to allow pieces of lumber L to be quickly positioned to form the truss. However, the jigging system is different. The jigging system of truss table 12' includes a plurality of jig rails 28' movably mounted on opposite guide tracks 29'. Each jig rail 28' is operatively connected to a prime mover, such as an electric motor, to move the jig rail along the guide tracks 29' (e.g., parallel to the longitudinal axis of the truss table 12'). Each jig rail 28' can move independently of the other jig rails. Each jig rail 28' includes at least one clamp assembly 44' movably mounted on the jig rail 28'. Each clamp assembly 44' is operatively connected to a primer mover, such as an electric motor or servo, to move the clamp assembly along the jig rail. In one embodiment, some or all of the jig rails 28' may support two clamp assemblies 44', although more or fewer clamp assemblies are within the scope of the present disclosure.

The clamp assemblies 44' operate similarly to the stops 26 and are configured to facilitate the positioning and holding of the pieces of lumber L on the truss table 12'. The clamp assemblies 44' are also configured to clamp or grip the pieces of lumber L to secure the pieces of lumber in position on the truss table 12'. As shown in FIG. 5, a portion (e.g., a clamp member) of the clamp assembly 44' can extend over a portion of the piece of lumber L to clamp and hold the piece of lumber between the jig rail 28' and the clamp assembly. For example, each clamp assembly 44' can include an actuator (not shown), such as a pneumatic actuator, to clamp the piece of lumber L. Each clamp assembly 44' can also include another prime mover, such as a servo, to rotate the clamp assembly relative to the jig rail 28' and the piece of lumber L. The clamp assembly 44' can be configured to rotate 360 degrees in any direction. Preferably, the clamp assembly 44' extends generally perpendicular to the piece of lumber L relative to an edge of the piece of lumber, as shown in FIG. 5. The clamp assembly 44' can also include a stop (not shown), similar to stop 26, to engage the edge of the piece of lumber L to help locate the piece of lumber in its proper position on the truss table 12'. The truss table 12' can also include a locator or reference fence 46' with an end stop 48' fixed to and extending along one side of the truss table 12'. This reference fence 46' and end stop 48' can be used to locate and position a particular member of the truss, such as the bottom cord, as will be described in more detail below. The truss table 12' can also include a sensor assembly (not shown) to ensure the pieces of lumber L are properly positioned on the truss table 12'.

The pieces of lumber L can be arranged on the truss table 12' manually, by the robotic placement device 16 or by a combination of automated and manual placement. Before the truss table 12' receives the pieces of lumber L, the jig rails 28' and clamp assemblies 44' are moved into position to adequately support and locate the pieces of lumber. This may be done by a control system (described in more detail below) using truss building optimization software. Preferably, the clamp assemblies 44' are moved close to or adjacent to their final position, but not at their final position, in order to provide some clearance to allow the pieces of lumber L to be placed on the truss table 12'. Not all jig rails 28' and associated clamp assemblies 44' need to be used for every truss and any jig rails not needed may be moved out of the way, as shown in FIG. 5. It will be understood that the table 12' may be used to position pieces for assembly which are not lumber. Moreover, the table 12' may be used for other than assembly of trusses.

As described above, the robotic placement device 16 picks up a piece of lumber L from the conveyor system 14 and places it on the truss table 12'. In this embodiment, the sensor assembly (e.g., camera(s), overhead sensor(s), and/or radar) determines the position of the piece of lumber L held by the head 24 of the robotic arm 22. If the piece of lumber L is not in its correct position on the truss table 12' as determined by the sensor assembly, the robotic arm 22 and/or head 24 will make adjustments (e.g., longitudinal, latitudinal and/or rotational movements) until the piece of lumber is in the correct position. Preferably, the first piece of lumber L positioned on the truss table 12' is the bottom chord of the truss, which is placed against the reference fence 46' and stop 48'. For this piece of lumber L, a few clamp assemblies 44' can then move into engagement with the piece of lumber, pushing the piece of lumber against the reference fence 46' and then clamp the piece of lumber (after rotating if needed), securing the piece of lumber in position, as shown in FIG. 5.

The robotic placement device 16 then delivers the remaining pieces of lumber L required to build the truss to the truss table 12'. The robotic arm 22 delivers each piece of lumber L to the truss table 12' and positions it appropriately. The positioning can be monitored by the sensor assembly, and any adjustments to the position of the piece of lumber can be made. Once the piece of lumber L is positioned on the truss table 12', a few clamp assemblies 44' clamp the piece of lumber L in position and then the head 24 of the robotic arm 22 will release the piece of lumber. If any further positioning of the piece of lumber L is required, as determined by the sensor assembly, the jig rails 28' and clamp assemblies 44' corresponding to the piece of lumber can be moved (linearly or rotated) together to move the piece of lumber into its final position (e.g., correctly oriented and engaged with one or more other pieces of lumber). If the piece of lumber L is held by two or more clamp assemblies 44', the two or more clamp assemblies move in a coordinated manner (e.g., together) to properly position the piece of lumber L. The sensor assembly can also be used to confirm the final, correct positioning of the pieces of lumber L. This process repeats until each piece of lumber L is positioned and secured on the truss table 12'. The stapler (not shown) of the robotic arm 22 can then staple the pieces (e.g., joints) of lumber L together, as described above.

Still referring to FIGS. 1-3, the lumber assembly and finishing system 10 includes a lumber construct transporter, generally indicated at 30, configured to transport or move the arranged lumber L from the truss table 12 or 12' to a press station, generally indicated at 50, while keeping the lumber in its arranged configuration (e.g., truss arrangement). As explained in more detail below, the press station 50 presses nailing plates P into the pieces of lumber L, securing them together to form the truss. The lumber construct transporter 30 includes at least one gantry 32. In the illustrated embodiment, the lumber construct transporter 30 includes two gantries, although more or fewer gantries are within the scope of the present disclosure. The lumber construct transporter 30 can have as many gantries 32 as needed to move the pieces of lumber L. Therefore, larger arrangements of lumber L may require additional gantries 32 in order to move them.

Each gantry 32 is moveably mounted on a gantry track or rail 34 of the lumber construct transporter 30. The gantry rail 34 extends generally along the length of the truss table 12 and to the press station 50. Each gantry 32 moves along the gantry rail 34 to move the lumber L from the truss table 12 to the press station 50. Each gantry 32 includes one or more prime movers (not shown), such as electric motors, operatively connected to the gantry rail 34 to move the gantry along the gantry rail. Thus, the gantries 32 are independently moveable relative to one another. Each gantry 32 includes a rail mount 36, a support post 38 and spanning member 40. The rail mount 36 connects to the gantry rail 34 and mounts the gantry 32 to the gantry rail. The support post 38 extends upward from the rail mount 36. The spanning member 40 extends outward from the support post 38. The spanning member 40 is cantilevered from the rail mount 36. The spanning member 40 extends over the truss table 12 when the gantry 32 is positioned along the truss table. Each gantry 32 includes a head 42 configured to pick up at least some of the pieces of lumber L. The head 42 can move vertically to reach the lumber on the truss table 12 and to align the lumber with the press station 50, as described below. In one embodiment, the head 42 uses suction to pick up the lumber, although other configurations are within the scope of the present disclosure. Preferably, the head 42 is elongate and has a length generally equal to the width of the truss table 12 to ensure the head grabs every piece of lumber L disposed below the gantry 32. In one embodiment, the head 42 comprises a plurality of pad sections (not shown) that operate (e.g., turn on and off) independently from one another. This enables the head 42 to apply suction only where needed to grip the pieces of lumber L.

To move the arranged lumber L on the truss table 12 to the press station 50, the gantries 32 are positioned over the arrangement. The heads 42 of the gantries 32 move downward and grab the lumber L. Once the head 42 grab the pieces of lumber L, the stops 26 or clamp assemblies 44' release the pieces of lumber. This ensures the pieces of lumber L do not move or shift once the stops 26 or clamp assemblies 44' are released. The heads 42 are then moved upward, raising the lumber L off the truss table 12. After the pieces of lumber L are separated from the truss table 12, 12' by the lumber construct transporter 30, the truss table can be rearranged (e.g., stops 26, jig rails 28' and/or clamp assemblies 44' can be moved) to prepare to receive the next set of lumber L for the next truss. The gantries 32 raise the lumber L to be horizontally aligned with an inlet 64 of the press station 50. The gantries 32 move in unison toward the press station 50, delivering the lumber L to the press station. The staples help hold the pieces of lumber L together while the truss is being moved into the press station 50. As the gantries 32 hand off the lumber L to the press station 50, a set of rollers 66 (FIG. 8), which define the inlet 64 of the press station, receives the lumber there-between. The rollers 66 may move toward another to clamp the lumber L as the lumber is fed into the press station 50. The gantries 32 continue to move with the lumber L as the lumber is fed into the press station 50. Once a gantry 32 gets to or close to the press station 50, the gantry releases the lumber L (e.g., the head 42 is disengaged from the truss) while any subsequent gantries continue to move with the lumber. Likewise, the subsequent gantries 32 release the lumber once they also get close to the press station 50 and before colliding with the immediately prior gantry. After all the gantries 32 have released the lumber, the gantries move back toward the truss table to pick up the next set of lumber L arranged thereon.

Referring to FIGS. 1-3 and 6-8, the lumber assembly and finishing system 10 includes the press station 50 and a magazine station 52 (collectively, a press assembly). The magazine station 52 is configured to supply the press station 50 with nailing plates P. The press station 50 is configured to receive the nailing plates P and then press or embedded them into adjacent pieces of lumber L to secure the pieces of lumber together to form the truss. The magazine station 52 includes a plurality of magazines or cartridges 54 that are configured to receive, hold and dispense the nailing plates P. The magazine station 52 can have anywhere between 5-10 cartridges, although more or fewer are within the scope of the present disclosure. The cartridges 54 can hold nailing plates P of the same size or the cartridges can hold different sizes of nailing plates. It is understood that several different sizes of nailing plates P can be used to join the pieces of lumber L together to form the truss. The nailing plates P are loaded into each cartridge 54 in pairs, with the nail sides facing and overlapping one another. A platform 86 adjacent the cartridges 54 allows an operator to load the cartridges with nailing plates P dynamically, while the press station 50 is operating. A shuttle 56 receives a pair of nailing plates P dispensed from one of the cartridges 54 (e.g., at the bottom thereof) and transports the pair of nailing plates to the press station. The shuttle 56 may transport nailing plates P of different sizes as required by the press station 50 for each connection or joint between the pieces of lumber L.

Figure 6:
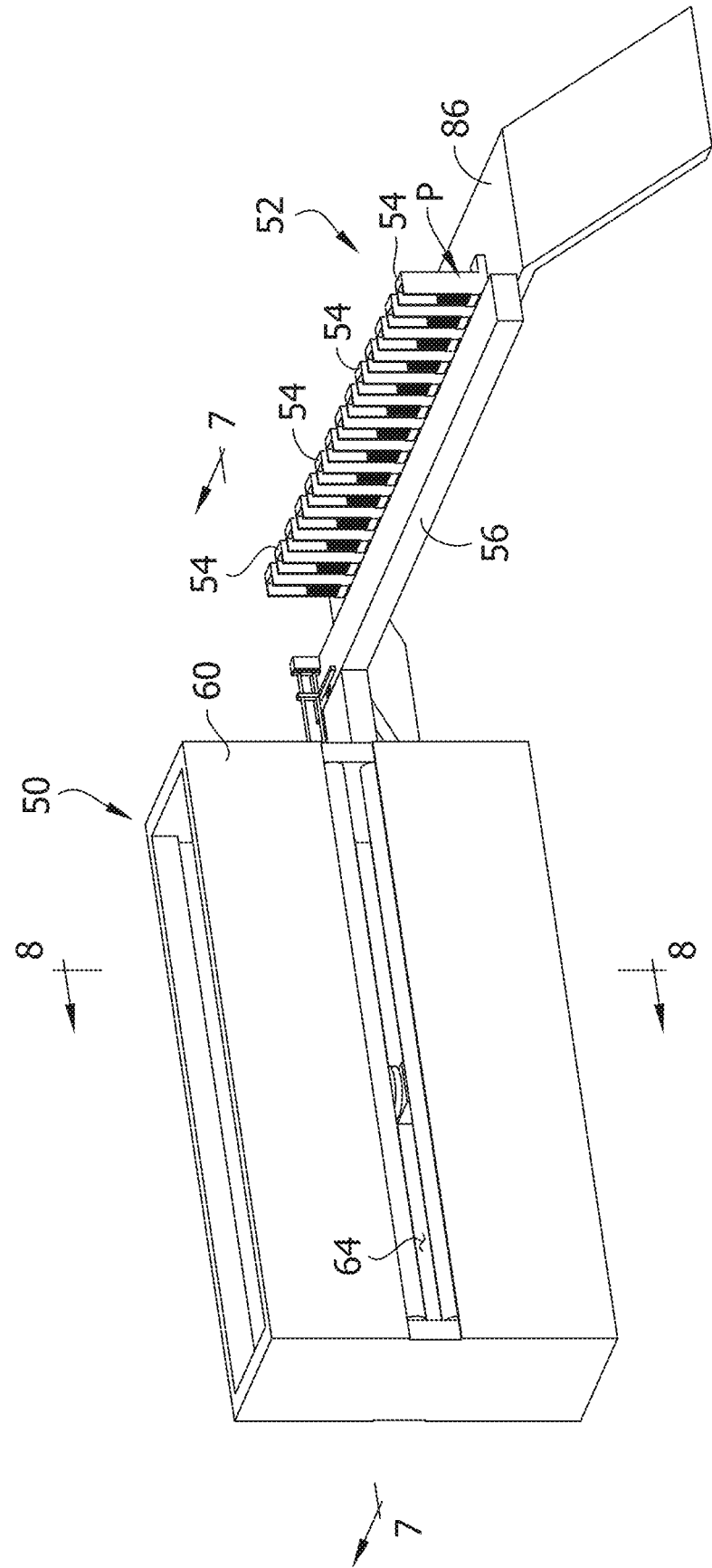
FIG. 6 is a perspective of the press station.
Figure 7:
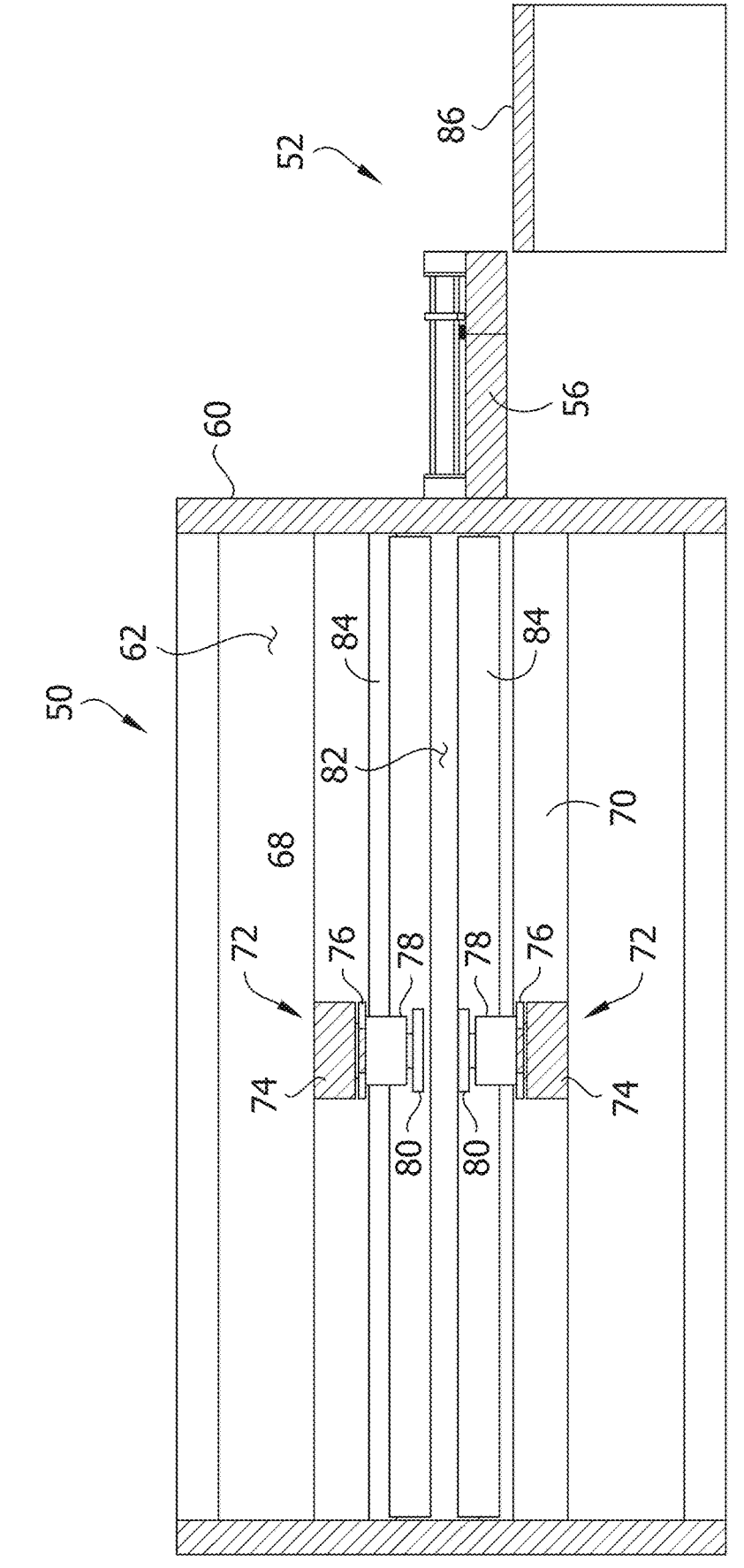
FIG. 7 is a section of the press station taken through line 7-7 of FIG. 6.
Figure 8:
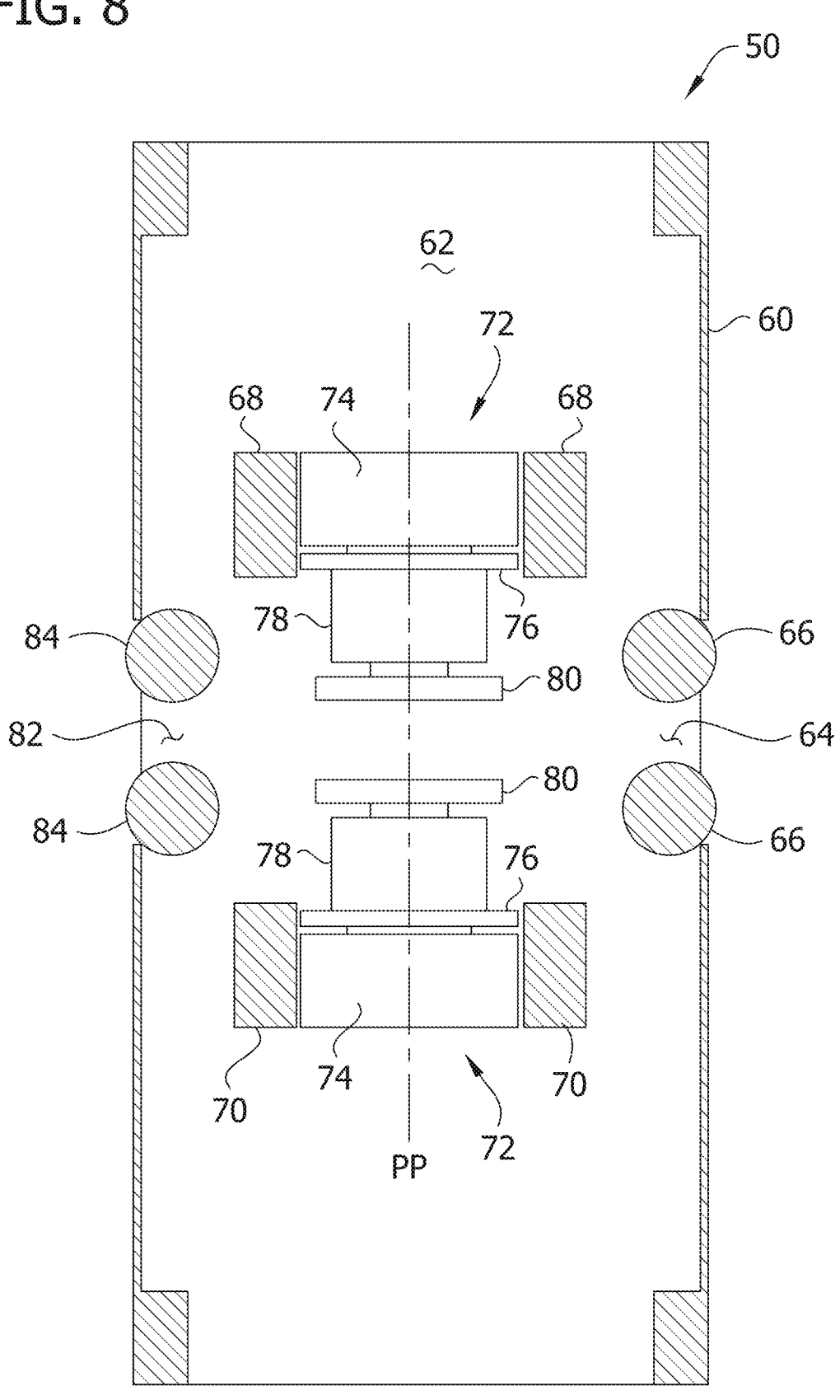
FIG. 8 is a section of the press station taken through line 8-8 of FIG. 6.

Referring to FIGS. 6-8, the press station 50 includes a housing 60 defining an open interior 62. The housing 60 has a generally rectangular shape. As mentioned above, the inlet 64 of the press station is defined by a first set of rollers 66 (e.g., upper and lower rollers). The inlet 64 is a generally elongate slot through which the arranged pieces of lumber L (e.g., partially assembled truss) enter the interior 62 of the press station 50. The rollers 66 are moveably mounted on the housing 60 to move toward and away from one another to releasably clamp the lumber L as the lumber is fed into the press station 50. In one embodiment, one or more prime movers (not shown), such a linear actuators or servos, operatively move the rollers 66 to clamp the lumber L. The rollers 66 are also connected to another prime mover (not shown), such an electric motor, which rotates the rollers 66 in unison to feed and move the lumber L through the interior 62 of the press station 50. The press station 50 also includes an outlet 82 defined by a second set of rollers 84 (e.g., upper and lower rollers), that are generally identical to the first set of rollers 66. The outlet 82 is also a generally elongate slot through which the truss leaves the interior 62 of the press station 50. Like the first set of rollers 66, the second set of rollers 84 can also releasably clamp the truss and move the truss through the interior 62 and out of the press station 50.

The press station 50 includes a set of upper rails 68 and a set of lower rails 70, each set of rails extending through the interior 62 between opposite side walls of the housing 60. The upper rails 68 are disposed above the inlet 64 (e.g., above a horizontal plane extending through the inlet) and the lower rails 70 are disposed below the inlet (e.g., below a horizontal plane extending through the inlet). Each set of upper and lower rails 68, 70 supports a platen assembly 72 (e.g., upper and lower platen assemblies). The platen assemblies 72 are generally identical except that lower platen assembly faces upward and the upper platen assembly is rotated 180 degrees and faces downward. Thus, the platen assemblies 72 generally face each other. Each platen assembly 72 is configured to press or embed a nailing plate P into the lumber. The lower platen assembly 72 presses a nailing plate into a lower surface of the truss and the upper platen assembly simultaneously presses a nailing plate into an upper surface of the truss.

Each platen assembly 72 includes a carriage 74 movably mounted on either the upper or lower rails 68, 70. A prime mover, such as an electric motor, is operatively connected to the carriage 74 to move the carriage along a respective one of the upper or lower rails 68, 70. Each platen assembly 72 also includes a turntable 76, or some other rotation device, mounted on the carriage 74. The turntable 76 may be rotated by another prime mover (not shown), such as a servo, which can be configured to rotate the turntable through 360 degrees in any direction. The turntable 76 rotates to orient the nailing plates P relative to the lumber L (specifically the orientation of the pieces of lumber at the joint) before the nailing plates are pressed therein. A linear actuator or press 78 is supported by the turntable 76 and is configured to move a platen 80 toward the truss to press the nailing plate P into the lumber L. Each platen 80 is configured to grip and hold one nailing plate P. For example, the platens 80 can be magnetized to grip the nailing plate P. Other configurations of the platen assembly 72 are within the scope of the present disclosure. For example, the turntable 76 can be disposed between the platen 80 and linear actuator 78. Together the platen assemblies 72 define a press plane PP (FIG. 8), a generally vertical plane extending between the platen assemblies and generally aligned with the center of the platens 80.

In operation, the lumber construct transporter 30 delivers the lumber L to the press station 50 through the inlet 64, where the rollers 66 clamp the lumber L and move the lumber into the interior 62 of the housing 60. The lumber L is moved through the interior 62 until a joint (e.g., intersection of two or more pieces of lumber L) becomes generally aligned with the press plane PP, where the lumber L is then stopped. The lumber L may be moved through the press station 50 by the first set of rollers 66, the second set of rollers 84, and/or the lumber construct transporter 30. The platen assemblies 72 move along the upper and lower rails 68, 70 toward the shuttle 56 to receive the nailing plates P retrieved by the shuttle. Each platen 80 receives and grips one of the pair of nailing plates P delivered by the shuttle 56.

The upper platen assembly 72 grips the upper nailing plate P of the pair of nailing plates and the lower platen assembly grips the lower nailing plate of the pair. As a result and due to the manner in which the nailing plates P are loaded into the cartridges 54, the nailing plates are oriented with their nails facing the lumber L when gripped by the platen assemblies 72. Once the shuttle 56 delivers the nailing plates P, the shuttle returns to the cartridges 54 to pick up the next pair of nailing plates needed to construct the truss.

Once the platen assemblies 72 have received the nailing plates P, the platen assemblies are moved along the upper and lower rails 68, 70 until they are disposed above and below the joint, respectively. Before, during or after the platen assemblies 72 move to the location of the joint, the turntables 76 rotate the platens 80, and therefore the nailing plates P thereon, to correctly orient the nailing plates relative to the joint. Once at the joint location, the linear actuators 78 are activated to push the nailing plates P into the pieces of lumber L, over the joint, to secure the pieces of lumber together. Preferably, the platen assemblies 72 move together and in unison along the upper and lower rails 68, 70 and activate at the same time to press the nail plates into the lumber L over the same joint at the same time. This way, any stress caused by pressing the nailing plates P into the lumber L is minimized. Once the nailing plates P are embedded in the pieces of lumber L over the joint, the platens 80 are moved away from the joint by the liner actuators 78. Then, the first set of rollers 66, the second set of rollers 84, and/or the lumber construct transporter 30 continue to move the lumber through the interior 62 until the next joint is generally aligned with the press plane PP and the process repeats. This continues for each joint of the truss. Once all the joints have been secured with nailing plates P, the now assembled truss T is moved out of press station by the second set the second set of rollers 84. Other configurations of the press station are within the scope of the present disclosure. For example, the press station can include press rollers instead of platen assemblies for driving nailing plates into the pieces of lumber. In this embodiment, the nailing plates are positioned relative to the joint of the pieces of lumber by some other method (e.g., manually).

Referring back to FIG. 1, the lumber assembly and finishing system 10 includes a transfer conveyor 200 configured to receive the truss T from the press station 50. The transfer conveyor 200 may be a conveyor belt system or a series of rollers, as illustrated, although other configurations are within the scope of the present disclosure. A prime mover (not shown), such as an electric motor, powers the transfer conveyor 200 to move the truss T thereon. The lumber assembly and finishing system 10 may, optionally, include a finish press 210. In the illustrated embodiment, the transfer conveyor 200 carries the truss T from the press station 50 to the finish press 210. The finish press 210 further presses the nailing plates P into the pieces of lumber L to ensure that the nailing plates are fully embedded in the pieces of lumber. Further details on the finish press 210 may be found in U.S. Pat. No. 5,553,375. One example of a suitable finish press 210 is the Finish Roller II available from MiTek Industries, Inc. of Chesterfield, Missouri.

The lumber assembly and finishing system 10 includes another transfer conveyor 202 configured to receive the truss from the finish press 210. This transfer conveyor 202 carries the now fully assembled truss T to a location where the truss can be picked up and loaded onto a vehicle, such as a truck, and transported to the construction site. In the illustrated embodiment, the lumber assembly and finishing system 10 includes another robotic placement device 16″. Corresponding parts of the other robotic placement device 16″ will be given the same reference numerals as for the placement device 16, with the addition of a double prime. This second robotic placement device 16″ is generally identical to the robotic placement device described above, and thus a detailed description is omitted here, except that the robotic arm 22″ of the second robotic placement device includes a head 220 configured to pick up the assembled trusses T, not just single pieces of lumber L like head 24. In the illustrated embodiment, the head 220 of the second robotic placement device 16″ uses suction to pick up the assembled truss T, although other configurations are within the scope of the present disclosure. In this embodiment, the head 220 includes two elongate suction pads 222 which are spaced apart and generally parallel to one another. This ensures the head 220 can adequately grab the assembled truss T. Each suction pad 222 may include a plurality of independently operable suction pad sections (not shown), like head 42.

The second robotic placement device 16″ is configured to pick up the assembled truss T from the transfer conveyor 202 and stack them at a stack station 220. The stacked trusses T can then be moved from the stack station 220 and loaded onto a transport. In one embodiment the stack station 220 is a table. In another embodiment, the stack station 220 is a conveyor the robotic placement device 16″ can stack the assembled trusses T on and then the conveyor transports the stacked trusses to a loading bay where the trusses can be loaded onto a vehicle. In one embodiment, the lumber assembly and finishing system 10 does not include the second robotic placement device 16″ and, instead, one or more operators grab the trusses T from the transfer conveyor 202 and stack the trusses on the stack station 220.

The operations of the components (e.g., truss table 12, 12′, robotic placement devices 16, 16″ lumber construct transporter 30, press station 50, transfer conveyors 200, 202 and/or finish press 210) of the lumber assembly and finishing system 10 are controlled by a control system 230. The control system 230 (broadly, a computer) includes a CPU or processor (e.g., a control system processor) and RAM or memory (broadly, non-transitory computer-readable storage medium). The control system 230 controls and operates the various components of the lumber assembly and finishing system 10. Broadly, the memory includes (e.g., stores) processor-executable instructions for controlling the operation of the lumber assembly and finishing system 10 and the components thereof. The instructions embody one or more of the functional aspects of the lumber assembly and finishing system 10 and the components thereof, as described herein, with the processor executing the instructions to perform said one or more functional aspects. The components of the lumber assembly and finishing system 10 may be in wired or wireless communication with the control system 230. Other configurations of the control system 230 are within the scope of the present disclosure. In one embodiment, the control system for the lumber assembly and finishing system 10 is the control system for the lumber cutting and delivery system described in PCT Application No. PCT/US2018/056723.

Although described in connection with an exemplary computing system environment, embodiments of the aspects of the disclosure are operational with numerous other general purpose or special purpose computing system environments or configurations. The computing system environment is not intended to suggest any limitation as to the scope of use or functionality of any aspect of the disclosure. Moreover, the computing system environment should not be interpreted as having any dependency or requirement relating to any one or combination of components illustrated in the exemplary operating environment. Examples of well-known computing systems, environments, and/or configurations that may be suitable for use with aspects of the disclosure include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the disclosure.

Embodiments of the aspects of the disclosure may be implemented with processor-executable instructions. The processor-executable instructions may be organized into one or more processor-executable components or modules on a tangible processor readable storage medium. Aspects of the disclosure may be implemented with any number and organization of such components or modules. For example, aspects of the disclosure are not limited to the specific processor-executable instructions or the specific components or modules illustrated in the figures and described herein. Other embodiments of the aspects of the disclosure may include different processor-executable instructions or components having more or less functionality than illustrated and described herein.

The order of execution or performance of the operations in embodiments of the aspects of the disclosure illustrated and described herein is not essential, unless otherwise specified. That is, the operations may be performed in any order, unless otherwise specified, and embodiments of the aspects of the disclosure may include additional or fewer operations than those disclosed herein. For example, it is contemplated that executing or performing a particular operation before, contemporaneously with, or after another operation is within the scope of aspects of the disclosure.

Having described the invention in detail, it will be apparent that modifications and variations are possible without departing from the scope of the invention defined in the appended claims.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products without departing from the scope of the invention, it is intended that all matter contained in the above description and shown in the accompanying drawings shall be interpreted as illustrative and not in a limiting sense.

What is claimed is:

1. A method of forming an assembly of pieces of lumber connected together by nailing plates, the method comprising:

pressing at a press station a first nailing plate into at least two of the pieces of lumber at a first joint so that said at least two of the pieces of lumber are connected together by the nailing plate at the first joint;

moving said at least two of the pieces of lumber connected together by the first nailing plate at the first joint out of the press station using a lumber handling assembly comprising a gantry positioned above the press station and movable with respect to the press station;

pressing at the press station a second nailing plate into at least two of the pieces of lumber at a second joint at the press station after the first nailing plate has been pressed into said at least two pieces of lumber at the first joint and moved by the gantry out of the press station.

2. The method of claim 1 further comprising moving said at least two of the pieces of lumber of the first joint and said at least two of the pieces of lumber of the second joint out of the press station using the gantry.

3. The method of claim 2 further comprising pressing a third nailing plate into at least two of the pieces of lumber at a third joint at the press station after the first nailing plate has been pressed into said at least two of the pieces of lumber at the first joint, after the second nailing plate has been pressed into said at least two of the pieces of lumber at the second joint and after the first and second joints have been moved by the gantry out of the press station.

4. The method of claim 3 wherein said step of pressing at the press station the first nailing plate includes pressing at the press station a third nailing plate into the at least two of the pieces of lumber at the first joint.

5. The method of claim 4 wherein said step of pressing at the press station the second nailing plate includes pressing at the press station a fourth nailing plate into the at least two of the pieces of lumber at the second joint.

6. The method of claim 5 wherein said step of pressing at the press station the third nailing plate includes pressing at the press station a fifth nailing plate into the at least two of the pieces of lumber at the third joint.

7. The method of claim 1 wherein said step of pressing at the press station the first nailing plate includes moving within the press stations a platen carrying the first nailing plate into position adjacent the first joint.

8. The method of claim 7 wherein said step of pressing at the press station the second nailing plate includes moving within the press station the platen carrying the second nailing plate into position adjacent the second joint.

9. The method of claim 7 wherein said step of moving said at least two of the pieces of lumber comprises moving said at least two of the pieces of lumber in a first direction, and wherein moving the platen within the press station comprises moving the platen in a second direction transverse to the first direction.

* * * * *